Jan. 31, 1956 K. C. AUGENSTEIN 2,732,684
TUBULAR EXPANSIBLE BAND WITH IMPROVED STOP MEANS
Filed Sept. 25, 1952
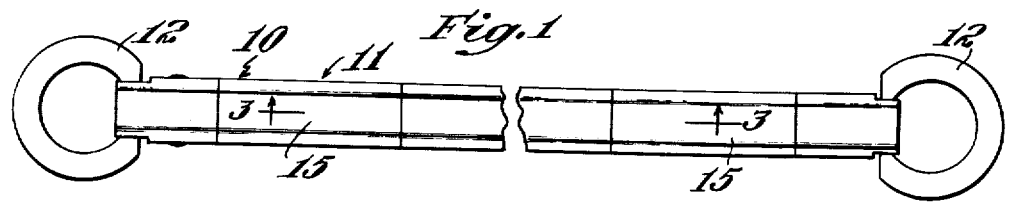
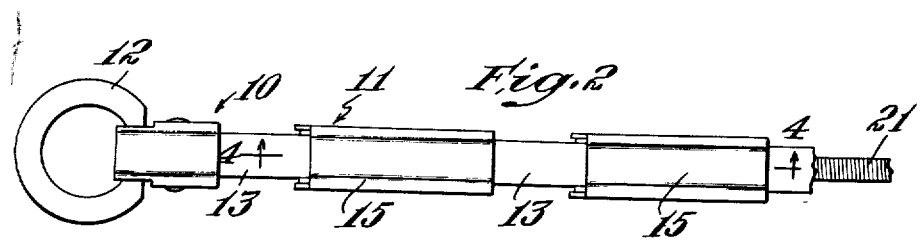
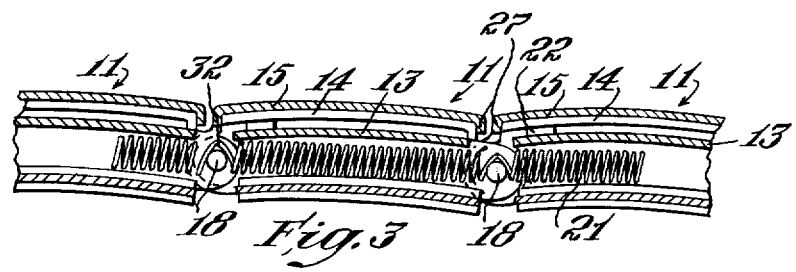
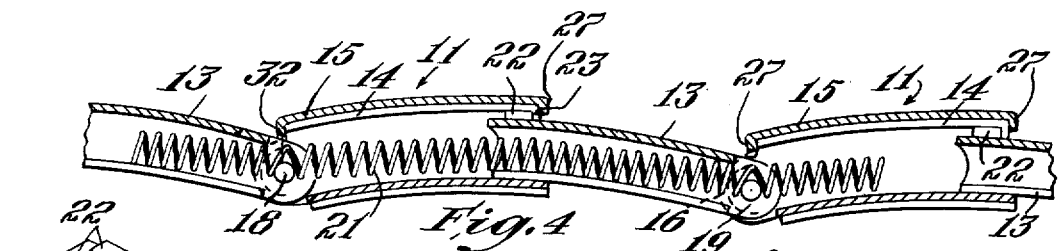
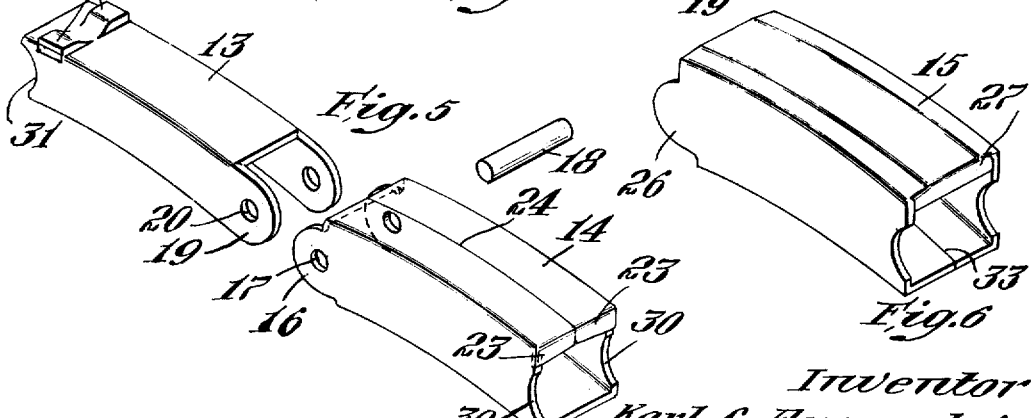
Inventor
Karl C. Augenstein
by Dike, Thompson & Sanborn
att'ys.

United States Patent Office 2,732,684
Patented Jan. 31, 1956

2,732,684

TUBULAR EXPANSIBLE BAND WITH IMPROVED STOP MEANS

Karl C. Augenstein, Cranston, R. I., assignor to Speidel Corporation, Providence, R. I., a corporation of Rhode Island Application September 25, 1952, Serial No. 311,496

7 Claims. (Cl. 59—79)

The present invention relates to an improved expansible band of telescopical tubular links to be used as a wrist watch strap, a bracelet, or the like.

The links of a tubular expansible band are made up of two tubular sections, one of which telescopes into the other. The links may be expanded or contracted lengthwise but are urged to a contracted postion by the tension of a spring extending longitudinally and axially inside of the links. Thus, the series of links pivotally connected end to end to form a band expand as the band is slipped over the wearer's hand and then contract to fit snugly around the wrist.

The sections of the links are relatively small and are made of thin sheet metal stampings which are bent into the desired tubular shapes.

Due to the nature of the assembly when one of the inner parts breaks or wears out, it is uneconomical to repair the band and ordinarily it must be discarded.

One object of the present invention is to provide a tubular expansible band which will be strong and durable and which will stand up under much greater stresses and last for a much longer time than do present constructions of such expansible bands.

A further object is to provide a tubular expansible band in which the top shell, in addition to being ornamental, gives added strength to the structure of the band.

Other objects and advantages will be apparent from the following description and the accompanying drawings in which:

Fig. 1 is a top plan view, with the control portion broken away, showing a watch band embodying the invention, the links being in their fully contracted position;

Fig. 2 is a top plan view of one end of a watch band embodying the invention showing the links in partially expanded position;

Fig. 3 is an enlarged section on the line 3—3 of Fig. 1;

Fig. 4 is an enlarged section on the line 4—4 of Fig. 2, but showing the links in fully expanded position;

Fig. 5 is a perspective view showing the inner tubular section of one link adjacent to one end of an outer tubular section of a second link and a pivot pin to join the ends of adjacent sections of successive links into a band of this invention; and Fig. 6 is a persepective view of an ornamental top shell.

The band 10, Figs. 1 and 2, is made up of telescopical links 11 connected end to end. The band, as shown, is designed to be attached to a wrist watch and connecting loops or rings 12 are provided at each end of the band for this purpose. However, it should be understood that the band of this invention may be used for any purpose without departing from the spirit of the invention.

As best seen in Figs. 3 and 4, each link 11 consists of an inner tubular section 13 fitting telescopically within an outer tubular section 14, and a top shell 15 enclosing the outer tubular section 14. These parts are made by forming pieces of sheet metal into open-ended tubes which may be substantially rectangular in cross section. In the embodiment illustrated the seams of the adjacent tubular parts are arranged to be at opposite sides of the assembled link, that is, the seam in the inner tubular member 13 is on the bottom, the seam 24 in the outer tubular member 14 is on the top, and the seam 33 in the top shell 15 is on the bottom.

One end of the outer tubular section 14 has rounded ears 16 (Fig. 5) projecting outwardly from the side walls. Each of these rounded ears 16 is provided with a perforation 17. The adjacent end of the adjacent inner tubular section 13 is provided with rounded ears 19 with corresponding perforations 20. A series of links 11 are joined together into a band by connecting the perforated end of an inner tubular section 13 to the perforated end of an outer tubular section 14 of the next link by inserting a pivot pin 18 through the perforations 20 and 17 with the ears 19 and 16 overlapped, and so on until the desired number of links are joined.

Looking at Figs. 3, 4 and 5 one end of each outer tubular section 14 is provided with a cut-out portion 30 to provide for full contraction of the links and to permit pivotal movement of the links with the band in contracted position. One end of each inner section is provided with a cut-out portion 31 to provide clearance for the pivot pin 18 when the links 11 are in contracted position.

The inner tubular section 13 and the outer tubular section 14 of each link are urged into contracted or fully telescoped position by the tension of the coil spring 21 which extends longitudinally within the links from one end of the band to the other. At intervals along its length the coil spring 21 is secured to the pivot pins 18 by causing convolutions 32 to straddle and thus become anchored to the pivot pins 18. It will be appreciated that this makes for easier assembly of a band than providing a separate spring between each pair of pivot pins but the latter construction may be used without departing from this invention.

As seen in Fig. 4, when the links are fully expanded the inner tubular sections 13 are prevented from pulling all the way out of the outer tubular members 14 by stop portions 22 which project upwardly from the upper surface of the inner tubular section 13 and engage stop portions 23 which extend downwardly from the upper surface of the outer tubular section 14.

Referring to Fig. 5, each stop portion 22 is formed by stamping a portion of the top wall of the inner tubular member 13 upwardly so that it projects above the plane of the upper surface. Each stop portion 23 is formed by extruding it from the top wall and the adjacent side wall of the outer tubular section 14 so that it extends substantially at right angles to the top and side walls from which it was extruded or drawn. As indicated in Fig. 5, there are stop portions 23 at each side of the seam 24 and each stop portion 23 is integral across an upper corner of the end of the outer tubular section 14. Thus the stop portion 23 is not readily bent out of position when subjected to great strains as the links are roughly pulled to fully expanded position.

The top shell 15 shown in Fig. 6 forms an ornamental covering and it substantially encloses the walls of the outer tubular section 14, and when assembled it conforms to the shape and outline thereof and conceals the ends of the pivot pins 18. At one end it has rounded ears 26 which cover the rounded ears 16 of the outer tubular section 14. Since the top shells 15 are put on after the inner tubular sections 13 and outer tubular sections 14 have been assembled into links 11 and a series of links 11 have been joined in a band, the ears 26 cover the perforations 17 and lock the pivot pins 18 in position. At the ends of each top shell 15, lips 27 are bent downwardly to conceal the stops 22 and 23 of the associated tubular sections 13 and 14. One of these lips 27 is in side by side abutting relationship with the adjacent stops 23, reinforcing them and giving them added strength.

In use tubular expansible bands made according to this invention withstand much greater strains and give much longer service than other tubular expansible bands on the market.

While I have shown and described one desirable embodiment of the invention, it will be apparent to persons skilled in the art that various changes in shape, proportion and arrangement of parts, as well as the substitution of equivalent elements, may be made without departing from the spirit and scope of the invention, as set forth in the appended claims.

I claim:

1. A tubular expansible band comprising a series of telescopical links pivotally connected end to end, each of said links including an outer tubular section, an inner tubular section telescopically received within the outer tubular section, each of said links having pivotal means on said outer and inner sections at opposite ends thereof for connecting said links to adjacent links of said series, stop means on the inner tubular section, stop means on the outer tubular section, said stop means cooperating when the sections are extended a predetermined amount relative to each other to limit further extension, a spring within the outer and inner sections, first retaining means associated with one end of the outer tubular section for holding the adjacent portion of the spring stationary relative to said end of said outer tubular section and second retaining means associated with the opposite end of the inner tubular section for holding the adjacent portion of the spring stationary relative to said end of said inner tubular section, whereby said spring urges said outer and inner tubular sections into contracted telescopical relation, said outer tubular section being made of a single piece of metal formed to a substantially tubular shape which is generally rectangular in cross section to provide top, bottom and side walls, said stop means on the outer section comprising an abutment member formed from the piece of metal from which the outer section is made, extending inwardly from one wall of the outer section and inwardly from at least one of the walls adjacent to said one wall and being integral with both said one wall and said adjacent wall, and said stop means on the inner tubular section comprising a portion of said inner section displaced outwardly away from a face of said inner section in a direction laterally along the width of said face with a bend line connecting said displaced portion and said face extending in a direction generally parallel to the longitudinal axis of the band, said displaced portion comprising wall means the length of which extends in a direction generally laterally along the transverse width of said face providing a transverse side for engagement with said abutment member.

2. The band of claim 1 wherein at least a part of said outwardly displaced portion is substantially parallel to the face of the inner section from which it was displaced.

3. The band of claim 1 wherein said one wall of said outer section is the top wall thereof and said abutment member extends downwardly from said top wall and said adjacent wall with which said abutment member is also integral is one of the side walls of said outer section.

4. The band of claim 1 wherein said outer section has a seam running longitudinally of one of its walls and said band also comprises an ornamental top shell substantially enclosing said outer section.

5. A tubular expansible band comprising a series of telescopical links, each of said links including an outer tubular section, an inner tubular section telescopically received within the outer tubular section, stop means on the outer tubular section, stop means on the inner tubular section, said stop means cooperating, when the sections are extended a predetermined amount relative to each other, to limit further extension, spring means within said links for urging said inner and outer tubular sections into contracted telescopical relation, at least one of said stop means on said inner and outer sections comprising a portion of said section displaced away from a face thereof in a direction generally laterally along the width of said face with a bend line connecting said displaced portion and said face extending in a direction generally parallel to the longitudinal axis of the band, said displaced portion comprising wall means, the length of which extends in a direction generally laterally along the transverse width of said face providing a transverse side for engagement with said other stop means.

6. A tubular expansible band comprising a series of telescopical links pivotally connected end to end, each of said links including an outer tubular section, an inner tubular section telescopically received within the outer tubular section, each of said links having pivotal means on said outer and inner sections at opposite ends thereof for connecting said links to adjacent links of said series, stop means on the inner tubular section, stop means on the outer tubular section, said stop means cooperating when the sections are extended a predetermined amount relative to each other to limit further extension, a spring within the outer and inner sections, first retaining means associated with one end of the outer tubular section for holding the adjacent portion of the spring stationary relative to said end of said outer tubular section and second retaining means associated with the opposite end of the inner tubular section for holding the adjacent portion of the spring stationary relative to said end of said inner tubular section, whereby said spring urges said outer and inner tubular sections into contracted telescopical relation, said tubular sections being generally rectangular in cross section and having top, bottom and side walls, said stop means on the inner tubular section comprising a portion of the top wall of said inner section displaced upwardly away from the upper face thereof in a direction generally laterally along the width of said face with a bend line connecting said displaced portion and said face extending in a direction generally parallel to the longitudinal axis of the band, the dimension of said displaced portion which extends longitudinally of the band at said line of bend being greater than the height of said displaced portion, said displaced portion comprising wall means, the length of which extends in a direction generally laterally along the transverse width of said face providing a transverse side for engagement with said other stop means.

7. The band of claim 5 wherein at least a part of said displaced portion comprises a wall which is substantially parallel to the plane of the face of the section from which it is displaced.

References Cited in the file of this patent

UNITED STATES PATENTS

| | | |
|---|---|---|
| 311,722 | Cottle | Feb. 3, 1885 |
| 1,550,024 | Garst | Aug. 18, 1925 |
| 2,302,426 | Domler | Nov. 17, 1942 |
| 2,433,657 | Flaig | Dec. 30, 1947 |
| 2,539,110 | Wells | Jan. 23, 1951 |
| 2,608,050 | Bender | Aug. 26, 1952 |

Disclaimer 2,732,684.—*Karl C. Augenstein*, Cranston, R. I. TUBULAR EXPANSIBLE BAND WITH IMPROVED STOP MEANS. Patent dated Jan. 31, 1956. Disclaimer filed Dec. 31, 1956, by the assignee, *Speidel Corporation*.
Hereby enters this disclaimer to claims 5, 6, and 7 of said patent.
[*Official Gazette February 5, 1957.*]